(No Model.)
C. H. GILBERT.
DENTAL ENGINE HOLDER.
No. 318,177. Patented May 19, 1885.
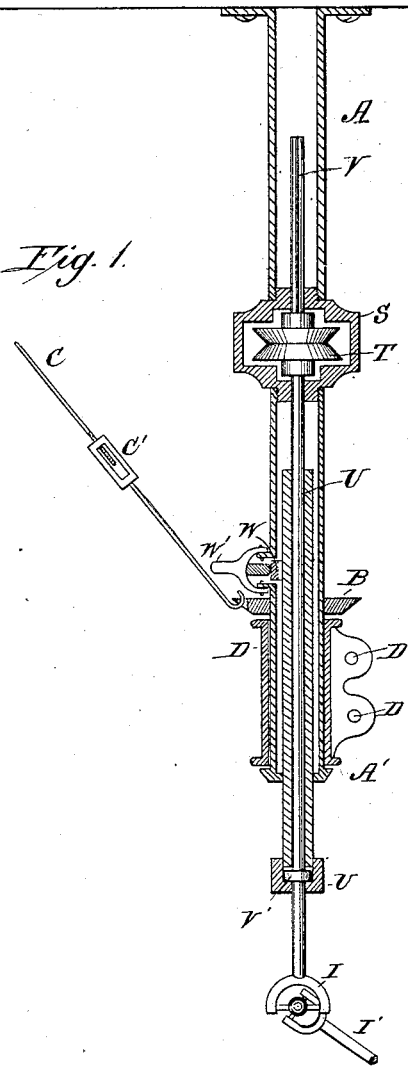
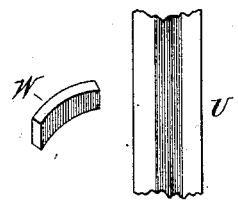
WITNESSES:
W. W. Hollingsworth
Chas. R. Wright
INVENTOR:
C. H. Gilbert
BY Munn & Co
ATTORNEYS.

UNITED STATES PATENT OFFICE.

CHARLES HENRY GILBERT, OF ANDOVER, MASSACHUSETTS.

DENTAL-ENGINE HOLDER.

SPECIFICATION forming part of Letters Patent No. 318,177, dated May 19, 1885.

Application filed August 2, 1884. (No model.)

*To all whom it may concern:*

Be it known that I, CHARLES HENRY GILBERT, of Andover, in the county of Essex and State of Massachusetts, have invented a new and Improved Dental-Engine Holder, of which the following is a full, clear, and exact description.

My invention relates to improvements in dental-engine holders; and it consists in the peculiar construction and arrangement of parts, as hereinafter fully described, and pointed out in the claims.

Reference is to be had to the accompanying drawings, forming part of this specification, in which similar letters of reference indicate corresponding parts in all the figures.

Figure 1 is a longitudinal sectional elevation of my improvement. Fig. 2 is a detail view of the milled tube and bearing-piece.

A tube, A, is secured firmly in the ceiling, from which it projects downward to a suitable elevation above the floor, and is provided a short distance above its lower end with an annular flange, A''. A fixed collar, B, is provided with a series of apertures for receiving the lower hook ends of brace-rods C, having their upper ends secured to hooks on the ceiling, or held to the ceiling in any other suitable manner, and which brace-rods are provided with turn-buckles or swivels C', for drawing them taut, and thus adjusting and holding the tube A absolutely vertical. Below the fixed collar B a sleeve or collar, D, is held to revolve on the tube A, the said sleeve D resting on the flange A', formed on the lower end of the tube A. The collar D is provided with two pairs of lugs or jaws, D', one above the other, to which jaws a bracket is to be pivoted.

In the tube A a circular box, S, is secured, in which a grooved pulley, T, is mounted on a shaft, V, extending vertically through the tube A and projecting from the lower end of the same, the said shaft being squared at that part which passes through the pulley T. The shaft V passes through a tube, U, the outer surface of which is milled or provided with circumferential grooves, the tube U projecting from the lower end of the tube A. The rod or shaft V is provided near its lower end with a fixed collar, V', which rests on a nut, U', screwed on the lower end of the tube U. A flat piece of steel, W, having a milled edge, is connected with a cam-lever, W', pivoted to the side of the tube A, the said piece W projecting through a slot in the tube A. By means of the cam-lever W' the milled surface of the piece W can be pressed against the milled outer surface of the tube U, thus holding the said tube in the desired position. When the piece W is disengaged from the tube U, the said tube and the shaft V in the same can be raised or lowered more or less, the squared part of the shaft V sliding in the squared aperture of the pulley T. If desired, the shaft V may be replaced by cables, such as are generally used for transmitting motion from dental engines to the hand-piece. The lower end of the shaft V is connected by a universal joint, I, with the shaft I', for transmitting motion; or a cable can be used for transmitting motion from the shaft V to the shaft I'. A cord or belt passes through openings in the casing S and around the pulley T, which cord or belt is operated either by foot-power, a water-motor, an electric motor, or steam, gas, or any other suitable motor a greater or less distance from the bracket and its tube.

Having thus described my invention, what I claim as new, and desire to secure by Letters Patent, is—

1. The combination, with a suspended tube adapted to support a bracket, of a shaft within said tube, provided with a pulley, and means for vertically adjusting the said shaft in the tube, substantially as herein shown and described.

2. The combination, with the tube A, of the shaft V, the pulley T on the same, the milled tube U, surrounding the shaft V, and devices for locking the milled tube in the tube A, substantially as herein shown and described.

3. The combination, with the tube A, of the shaft V, provided with a pulley, T, the milled tube U, the milled piece W, and the cam-lever W', substantially as herein shown and described.

CHARLES HENRY GILBERT.

Witnesses:
GEORGE W. FOSTER,
GEORGE FOSTER.